Feb. 7, 1939.  R. L. ANDERSON  2,146,521
HARVESTER
Filed March 9, 1935
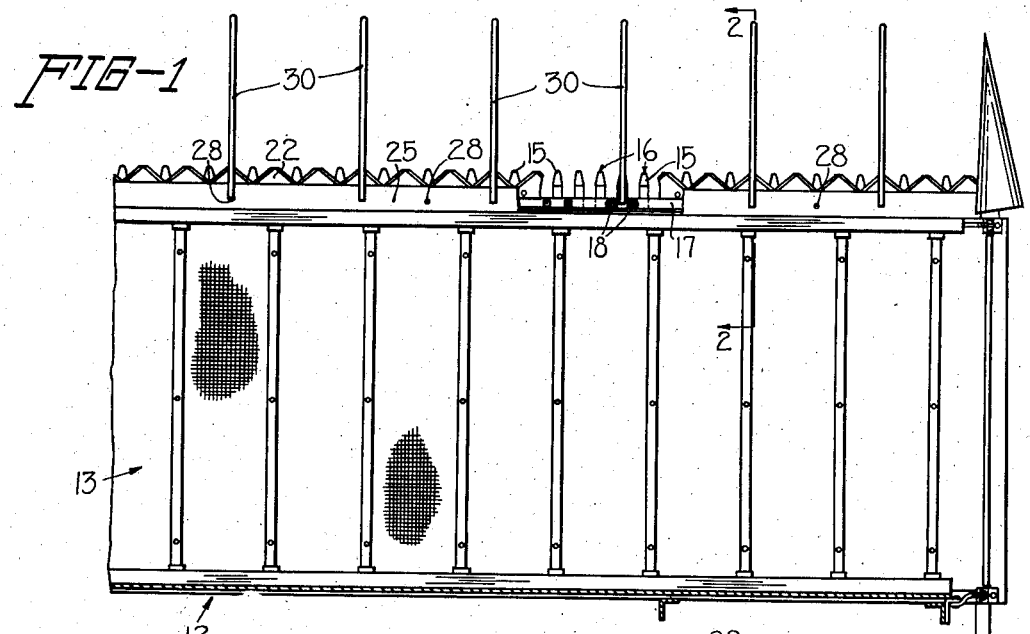
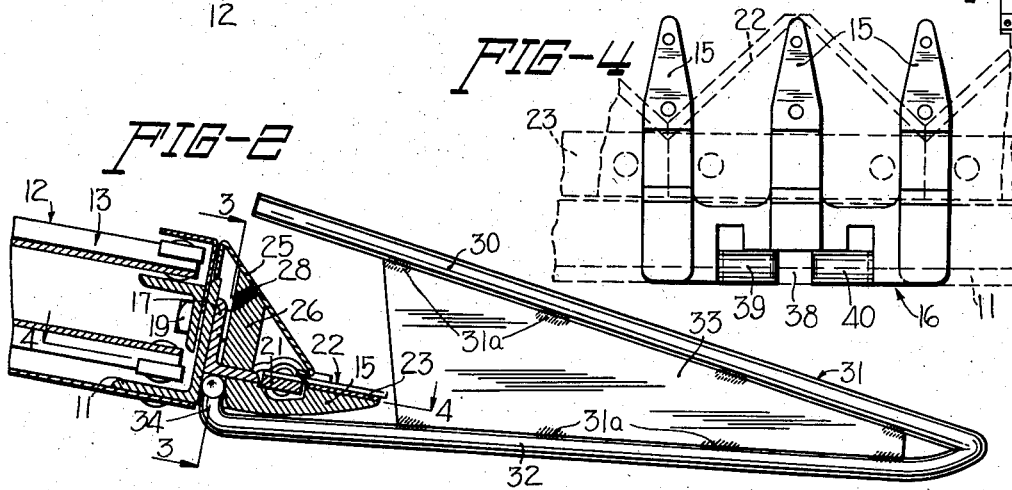
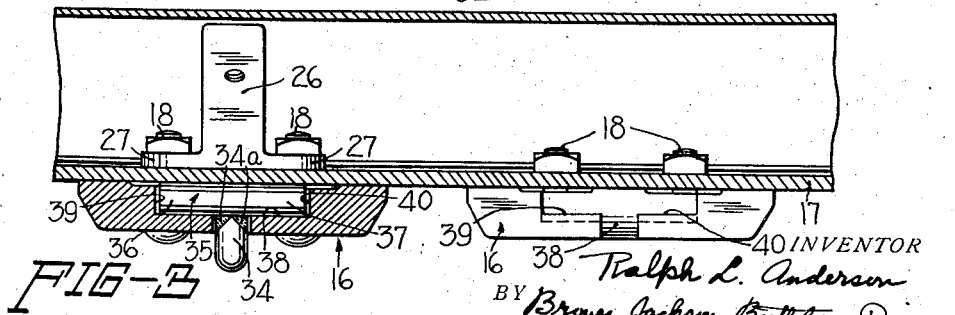
INVENTOR
Ralph L. Anderson
BY Brown, Jackson, Boettcher & Dienner
ATTORNEYS.

Patented Feb. 7, 1939

2,146,521

UNITED STATES PATENT OFFICE 2,146,521

HARVESTER

Ralph L. Anderson, Moline, Ill., assignor to Deere & Company, Moline, Ill., a corporation of Illinois Application March 9, 1935, Serial No. 10,296

21 Claims. (Cl. 56—312)

The present invention relates to improvements in harvesters of the type commonly known as combines and binders which are used to cut and harvest grain and other crops, and has more particularly to do with such harvesters when equipped for harvesting soy beans or other vine crops.

As is well known, combines and binders are equipped with cutting mechanism which cuts the grain or other crop and delivers it to a conveyor which carries the crop to the other operating mechanisms of the harvester. This cutting mechanism comprises a reciprocating sickle or knife associated with which are a plurality of guard fingers. In the harvesting of soy beans and other similar vine crops, however, the harvester is ordinarily provided with what are commonly termed in the trade lipless guard fingers, and in addition to such guard fingers a number of lifting guards are also employed for raising the vines up from the ground surface so that they may be properly positioned to be cut by the sickle of the cutting mechanism. Heretofore it has been customary to attach such lifting guards to the cutting apparatus of a binder or combine by means of suitable brackets fastened to the top of the front angle member or bar of the harvester platform. However, in the harvesting of certain kinds of vine crops, and especially soy beans, it has also been found desirable to provide an inclined shield forming a smooth unobstructed surface between the reciprocating sickle and the upper front corner or edge of the conveyor platform so that the vines can be conducted from the sickle to the conveyor without danger of their getting caught and collecting at any points therealong. Therefore, if under the old practice a shield as above mentioned were provided between the sickle and the upper front corner of the conveyor platform, it would be necessary to cut holes in the inclined shield to receive the rear ends of the lifting guards so that they could be connected to the brackets carried by the front angle member. It will be appreciated, however, that such a structure would be very objectionable because the vines would tend to catch in the edges of the holes or slots provided in the shield and tend to collect at such points, thus obstructing the free flow of vines onto the platform. It is also desirable, in harvesters of this type, to support the guard fingers on the front edge of the platform in as low a position as possible.

With the above in mind it is the principal object of the present invention to provide new and improved means for attaching the lifting guards to the harvester platform.

Another object of the invention is to support the lifting guards for vertical pivotal movement on the guard fingers.

A further object of the invention is to provide an inclined shield extending from the reciprocating sickle to the upper front edge of the conveyor platform, whereby a smooth unobstructed flow of the cut vines onto the platform may be had.

A still further object of the invention is to provide improved means for attaching the guard fingers to the harvester platform frame whereby the guard fingers are positioned close to the ground surface during the operation of the harvester.

Other objects and advantageous features will be apparent from the following description of the preferred embodiment of my invention taken in connection with the accompanying drawing, in which:

Figure 1 is a top plan view of a portion of the front platform cutting mechanism and endless conveyor of a harvester provided with my improvements, certain parts being broken away to illustrate the mounting of the guard fingers and lifting guard;

Figure 2 is a vertical cross sectional view taken substantially on the plane of the line 2—2 of Figure 1, showing the relative positions of the various parts and illustrating the means for securing the inclined shield in position, one of the lifting guards being shown in side elevation.

Figure 3 is a fragmentary vertical cross sectional view taken on the plane of the line 3—3 of Figure 2 and illustrating the means for securing the guard fingers to the platform and the manner of supporting the lifting guards from the guard fingers; and Figure 4 is a view taken along the line 4—4 of Fig. 2, of one gang or set of three guard fingers, with the relative position of the sickle bar shown in dotted lines.

In the drawing only such parts of a harvester have been illustrated as are necessary for a complete understanding of the present invention. As there shown, 11 indicates the angle member or bar which forms the front frame member of the usual harvester platform 12 on which is supported in any suitable manner the slatted endless conveyor 13 which conveys the cut grain or other material to other operating mechanisms of the harvester.

As above mentioned, when harvesting soy beans and similar crops it is desirable to provide a series of special lipless guard fingers, and in the present construction they are indicated by the numeral 15. As best shown in Figure 4, these lipless guard fingers are formed in gangs or sets of three, each set consisting of a single casting 16. Each guard finger section 16 is preferably secured to the horizontally extending flange of an angle member or bar 17 by a pair of bolts 18, the vertical flange of said angle member 17 being secured to the front face of the vertically extending flange of the angle iron frame member 11 of the platform 12 by bolts 19 in such a position that the guard fingers 15 are disposed along and extend forwardly from the lower edge of the platform 12. The reciprocating sickle which comprises a knife back 21 to which are riveted a series of knife sections 22, rests on the usual ledger plates 23 which are riveted to the forward ends of the guard fingers 15. Thus the reciprocating sickle is supported by the several guard fingers 15.

In order to provide a smooth unobstructed surface between the reciprocating sickle and the top front edge of the harvester so that the vines of soy beans and like plants cut by the sickle will flow freely and unimpeded onto the platform, I provide a suitable inclined plate 25, preferably formed of sheet metal, extending from a point adjacent the sickle upwardly and rearwardly to just above the frame of the top of the platform 12 as shown in Figure 2. This plate 25 extends substantially from end to end of the harvester platform as shown in Figure 1. A series of spaced brackets 26 are provided for supporting the plate 25, said brackets extending upwardly from the horizontal flange of the angle iron member 17 as shown in Figures 2 and 3 and provided with perforated laterally extending lugs 27 on opposite sides, as best shown in Figure 3, by which they are bolted to said horizontal flange by the bolts 18 above mentioned. These bolts also serve to secure the guard finger gangs 16 to the horizontal flange of the angle iron 17. The plate 25 is fixed to the several brackets 26 by means of machine screws 28 extending through perforations provided in the plate and threaded into internal screw threaded openings provided in the brackets, as shown in Figure 2.

In the harvesting of soy beans and similar vine crops, it is also desirable to employ a series or plurality of lifting guards to raise the vines from the ground into proper cutting position as before mentioned, and to this end I provide suitable lifting guards indicated as an entirety by the numeral 30. As best shown in Figure 2, each of the lifting guards of the present invention is formed of rod material of circular cross section bent in substantially V formation to provide an upper inclined portion 31 and a lower runner portion 32, the point of the V forming the front or outer end of the guard. A piece of sheet metal 33 is welded or otherwise suitably secured between the two portions 31 and 32 as shown at 31a, whereby vines will be prevented from becoming twisted or tangled on the members 31 and 32 of the runner.

For mounting the lifting guard on the harvester, the rear end of the runner portion 32 is bent upwardly, as shown at 34 in Figures 2 and 3, and has a cross piece 35 welded, as at 34a, to the top of said upwardly bent end 34 to form a pair of outwardly extending alined trunnions 36 and 37, as best shown in Figure 3.

In order to mount the lifting guards in the desired positions along the length of the cutting mechanism each guard finger section 16 is provided with a longitudinally extending slot 38 in its rear edge substantially centrally transversely thereof as shown in Figures 3 and 4 for receiving the upturned end 34 of the runner portion 32. Semi-cylindrical recesses 39 and 40 are provided at opposite sides of the slot 38 in the upper surface of the guard finger casting 16 for receiving the trunnions 36 and 37, respectively, of the runner portion 32.

It will be seen that by the construction just described the guard finger casting holds the lifting guard in position on the harvester, the lifting guard and guard finger casting being assembled together with the trunnions 36 and 37 positioned in the semi-cylindrical recesses 39 and 40, respectively, and the upturned rear end 34 of the portion 32 of the lifting guard being positioned in the slot 38 before the casting 16 is bolted to the horizontal flange of the angle iron member 17, as will be readily understood. With the several guard finger sections 16 in position on the harvester, the lifting guards supported thereby are likewise held in their proper position but are free to pivot for vertical swinging within certain limits, their downward movement being limited by the upturned portion 34 striking the lower edge or outer corner of the angle iron frame member 11 of the platform and their upward movement being limited by the runner portion 32 striking the lower side of the middle guard finger 15 of the guard finger section 16.

While I have illustrated and described my above mentioned improvements in connection with the cutting mechanism of a combine or binder it is to be understood that the same may be applied to any other types of agricultural implements for which it may be adapted, such as mowers and the like.

I claim:

1. In combination in harvesting means, a plurality of guard fingers, and a lifting guard supported wholly by certain of said guard fingers, said lifting guard extending forwardly from the guard finger and below the same.

2. In combination in harvesting means, a guard finger, and a lifting guard having its rear end pivotally supported directly on said guard finger, the main body portion of said lifting guard being positioned below said guard finger and extending forwardly therefrom.

3. In combination, in harvesting means, a guard finger, a lifting guard associated with said guard finger, and means pivotally connecting said lifting guard to said guard finger, said means comprising a pair of oppositely extending trunnions carried by the rear end of said lifting guard and seated in transversely extending recesses in said guard finger.

4. A harvester comprising, in combination, a platform, cutting mechanism, a plurality of guard fingers associated with said cutting mechanism, means for securing said guard fingers to the lower portion of the platform whereby said fingers will be disposed substantially in line with the lower edge of the platform, there being notches formed in certain of the guard fingers adjacent the forward lower edge of the platform, and lifting guards having pivot means disposed in said notches and extending forwardly underneath said guard fingers.

5. A harvester comprising, in combination, a platform including a front frame bar, cutting mechanism, a plurality of guard fingers associated with said cutting mechanism, means for securing said guard fingers to the platform whereby said fingers will be disposed substantially in line with the lower edge of the platform, said means comprising an angle member having its vertical flange secured to said frame bar and means securing said guard fingers to the under side of the horizontal flange of said angle member, and a plurality of lifting guards pivotally held between the lower rear portions of certain of said guard fingers and the underside of said horizontal flange.

6. In combination in harvesting means, a platform, a plurality of guard fingers secured to said platform, a lifting guard associated with each of certain of said guard fingers, and means for supporting said lifting guards from said guard fingers, said means comprising a pair of transversely extending trunnions formed integral with said lifting guard and disposed in the lower rear portion of recesses formed in said guard finger.

7. A harvester comprising, in combination, a platform, cutting mechanism, a plurality of guard fingers supported by said platform and associated with said cutting mechanism, a plurality of lifting guards supported by said platform, and a shield extending between said cutting mechanism and said platform for providing a smooth unobstructed surface for the material cut by said cutting mechanism.

8. A harvester comprising, in combination, a platform, cutting mechanism, a plurality of guard fingers associated with said cutting mechanism, a lifting guard associated with each of certain of said guard fingers, and a shield extending between said cutting mechanism and said platform for providing a smooth unobstructed surface for the material cut by said cutting mechanism.

9. A harvester comprising, in combination, a platform frame, a plurality of guard fingers carried by said frame adjacent the lower forward edge of said frame, a reciprocating sickle associated with said guard fingers, a shield extending from said sickle to the upper forward edge of said frame, supporting means for said shield, and means for securing said guard fingers to said frame, said last named means also being operative to secure said supporting means to said frame.

10. A harvester comprising, in combination, a platform frame, a plurality of guard fingers carried by said frame adjacent the lower forward edge of said frame, a recipocating sickle associated with said guard fingers, a shield extending from said sickle to the upper forward edge of said frame, brackets for holding said shield in position, lifting guards associated with certain of said guard fingers, and means for securing said guard fingers to said frame, said last named means also being operative to secure said lifting guards and said brackets to said frame.

11. A harvester comprising, in combination, a platform, a reciprocating sickle carried by said platform, a plurality of guard fingers secured to said platform and associated with said sickle, a plurality of lifting guards carried by said platform, and a shield comprising a plate carried by said platform and extending from the sickle to the upper front edge of said platform for providing a smooth unobstructed surface over which the material cut by the sickle is delivered to the platform.

12. A harvester comprising, in combination, a platform, cutting mechanism, a plurality of guard fingers associated with said cutting mechanism, certain of said guard fingers having transverse notches extending longitudinally of said platform, a shield extending between said cutting mechanism and said platform for providing a smooth unobstructed surface for the material cut by said cutting mechanism, and a lifting guard associated with each of certain of said guard fingers and having trunnion portions disposed in the notches of the guard finger and held in place by the latter against the platform and below said shield.

13. A harvester comprising, in combination, a platform including a front frame bar, an angle member having its vertical flange secured to said front frame bar and its other flange disposed substantially horizontally, a plurality of guard fingers disposed on the under side of said horizontal flange and extending forwardly thereof, and a sickle bar mounted for reciprocation on said guard fingers and disposed substantially in the plane of said horizontal flange.

14. A harvester comprising, in combination, a platform including a front frame bar, an angle member having its vertical flange secured to said front frame bar and its other flange disposed substantially horizontally, a plurality of guard fingers disposed on the under side of said horizontal flange and extending forwardly thereof, a sickle bar mounted for reciprocation on said guard fingers and disposed substantially in the plane of said horizontal flange, an inclined shield covering a portion of said sickle bar and extending rearwardly and upwardly to the upper edge of said front frame bar, and securing means for said shield comprising members disposed underneath the same and operatively connected with said angle member.

15. A harvester comprising, in combination, a platform including a front frame bar, cutting mechanism, a plurality of guard fingers associated with said cutting mechanism, an angle member having its vertical flange secured to said frame bar and its horizontal flange extending forwardly, said guard fingers being secured to the horizontal flange of said angle member, a shield covering a portion of said guard fingers and extending rearwardly and upwardly, and securing members fastened to the under side of said shield for operatively attaching the latter to the horizontal flange of said angle member.

16. A harvester comprising, in combination, a platform, cutting mechanism, a plurality of guard fingers associated with said cutting mechanism, a shield extending between said cutting mechanism and said platform for providing a smooth unobstructed surface for the material cut by said cutting mechanism, and a plurality of lifting guards associated with certain of said guard fingers, each lifting guard including a generally V-shaped member having one leg extending underneath the associated guard finger and connected for pivotal movement directly thereto, the other leg of the V-shaped lifting guard extending over said shield substantially to the rear edge thereof.

17. A harvester comprising, in combination, a platform, cutting mechanism, a plurality of guard fingers associated with said cutting mechanism, a shield extending between said cutting mechanism and said platform for providing a smooth unobstructed surface for the material cut by said cutting mechanism, a plurality of lifting guards associated with certain of said guard fingers, each lifting guard including a generally V-shaped member having one leg extending underneath the associated guard finger and connected for pivotal movement directly thereto, the other leg of the V-shaped lifting guard extending over said shield substantially to the rear edge thereof, and a sheet metal plate secured to the legs of said V-shaped lifting guard and extending rearwardly to a point adjacent the forward ends of said guard fingers.

18. An article of manufacture comprising a guard finger section in the form of a casting comprising a base portion with outwardly extending spaced guard fingers, and trunnion receiving recesses formed in the base portion of said guard finger section.

19. An article of manufacture comprising a guard finger section in the form of a casting comprising a base portion with outwardly extending spaced guard fingers, and trunnion receiving recesses formed in the base portion of said guard finger section, said recesses being disposed substantially transversely with respect to the guard fingers and separated by a slot extending through the guard finger section.

20. In combination, in harvesting means including a normally horizontally disposed bar, a guard finger fastened to the under side of said bar, and a lifting guard supported by and pivotally connected to the lower portion of said guard finger.

21. In combination, in harvesting means, a guard finger, a normally horizontal sickle bar mounted for reciprocation thereon, a lifting guard, and means connecting said lifting guard to said guard whereby said lifting guard is supported by said guard finger, said connecting means lying in a plane disposed below the plane of the sickle bar.

RALPH L. ANDERSON.

CERTIFICATE OF CORRECTION.

Patent No. 2,146,521. February 7, 1939.

RALPH L. ANDERSON.

It is hereby certified that error appears in the printed specification of the above numbered patent requiring correction as follows: Page 3, first column, lines 16 and 17, claim 6, strike out the words "the lower rear portion of" and insert the same after "in", line 17, same claim; page 4, second column, line 13, claim 21, after "guard" insert finger; and that the said Letters Patent should be read with this correction therein that the same may conform to the record of the case in the Patent Office.

Signed and sealed this 4th day of April, A. D. 1939.

Henry Van Arsdale (Seal) Acting Commissioner of Patents.